United States Patent [19]

Kuroda et al.

[11] Patent Number: 5,353,377
[45] Date of Patent: Oct. 4, 1994

[54] SPEECH RECOGNITION SYSTEM HAVING AN INTERFACE TO A HOST COMPUTER BUS FOR DIRECT ACCESS TO THE HOST MEMORY

[75] Inventors: Akihiro Kuroda, Tokyo; Masafumi Nishimura, Yokohama; Koichi Toshioka, Kawasaki, all of Japan

[73] Assignee: International Business Machines Corporation, Armonk, N.Y.

[21] Appl. No.: 931,240

[22] Filed: Aug. 17, 1992

[30] Foreign Application Priority Data

Oct. 1, 1991 [JP] Japan .................. 3-278896

[51] Int. Cl.5 .................................. G10L 9/00
[52] U.S. Cl. .................... 395/2.65; 395/2.6
[58] Field of Search ............... 381/41-45; 395/2.65, 2.6

[56] References Cited

U.S. PATENT DOCUMENTS

| | | | |
|---|---|---|---|
| 4,677,569 | 6/1987 | Nakano et al. | 381/43 |
| 4,718,094 | 1/1988 | Bahl et al. | 381/43 |
| 4,776,016 | 10/1988 | Hansen | 381/43 |
| 4,799,144 | 1/1989 | Parruck et al. | 364/200 |
| 4,833,712 | 5/1989 | Bahl et al. | 381/43 |

Primary Examiner—Allen R. MacDonald
Assistant Examiner—Michelle Doerrler
Attorney, Agent, or Firm—Marc D. Schechter; Robert P. Tassinari, Jr.

[57] ABSTRACT

A signal processing card packaged on a bus of a personal computer has a bus master which is used to access the main memory of the personal computer. A large table of probability values required for speech recognition is held in the main memory. When a label to be processed is generated, only the necessary part of the table is read from the main memory to the memory on the signal processing card by direct memory access transfer to perform speech recognition processing.

9 Claims, 5 Drawing Sheets

FREQUENCY

↓ LABELLING

↓

SPEECH RECOGNITION SYSTEM HAVING AN INTERFACE TO A HOST COMPUTER BUS FOR DIRECT ACCESS TO THE HOST MEMORY

BACKGROUND OF THE INVENTION

This invention relates to speech recognition and, more particularly, to a system capable of performing real time recognition of a large vocabulary by means of a signal processing card packaged on a bus of a personal computer (hereinafter called a PC).

Existing large vocabulary speech recognition systems are broadly divided into two categories according to their type of packaging.

A first category of speech recognition system performs speech recognition by storing in the recognition system all data on a vocabulary recognizable at a point of time, and by issuing the recognition result to a PC or the like (normally through a communication line such RS-232C). This system is often a box type (stand alone type) recognition system. Recognition systems of this type are very expensive because they require hardware for holding a large amount of data in the system. The DP-3000 speech recognition system of Nippon Electric Co., Ltd. is one speech recognition system of this type.

A second category of speech recognition system uses a signal processing card packaged on a bus of a PC for extracting characteristic values (alternatively, for extracting characteristic values and for labelling). The main processing for speech recognition is performed by a processor of the PC. Recognition systems of this type are inexpensive. However, a large part of the PC processor must be used for speech recognition itself, which often prevents the building of a large scale application using speech recognition or, on the other hand, may lead to a problem in the real time response speed of speech recognition. The Dragon Writer 1000 of Dragon Systems Inc. is one speech recognition system of this type.

No proposal has been known heretofore which realizes large vocabulary speech recognition at a low cost without imposing a load on the PC processor.

SUMMARY OF THE INVENTION

It is an object of the invention to provide a speech recognition system that performs real time large vocabulary speech recognition by means of a low cost signal processing card packaged on a PC bus without imposing a load on the PC processor.

According to the invention, a signal processing card has a bus master PC bus interface. A large table of probability values is stored in a main memory of the PC. In response to a series of labels obtained by word vocalization, only the necessary part of the table is read from the main memory of the PC into the memory of the signal processing card by direct memory access (DMA) transfer by the bus master of the signal processing card, and speech recognition processing is performed on the card. As a result, real time speech recognition of a large vocabulary is performed on a signal processing card having only a small scale memory.

DESCRIPTION OF THE PREFERRED EMBODIMENTS

Figure 1:
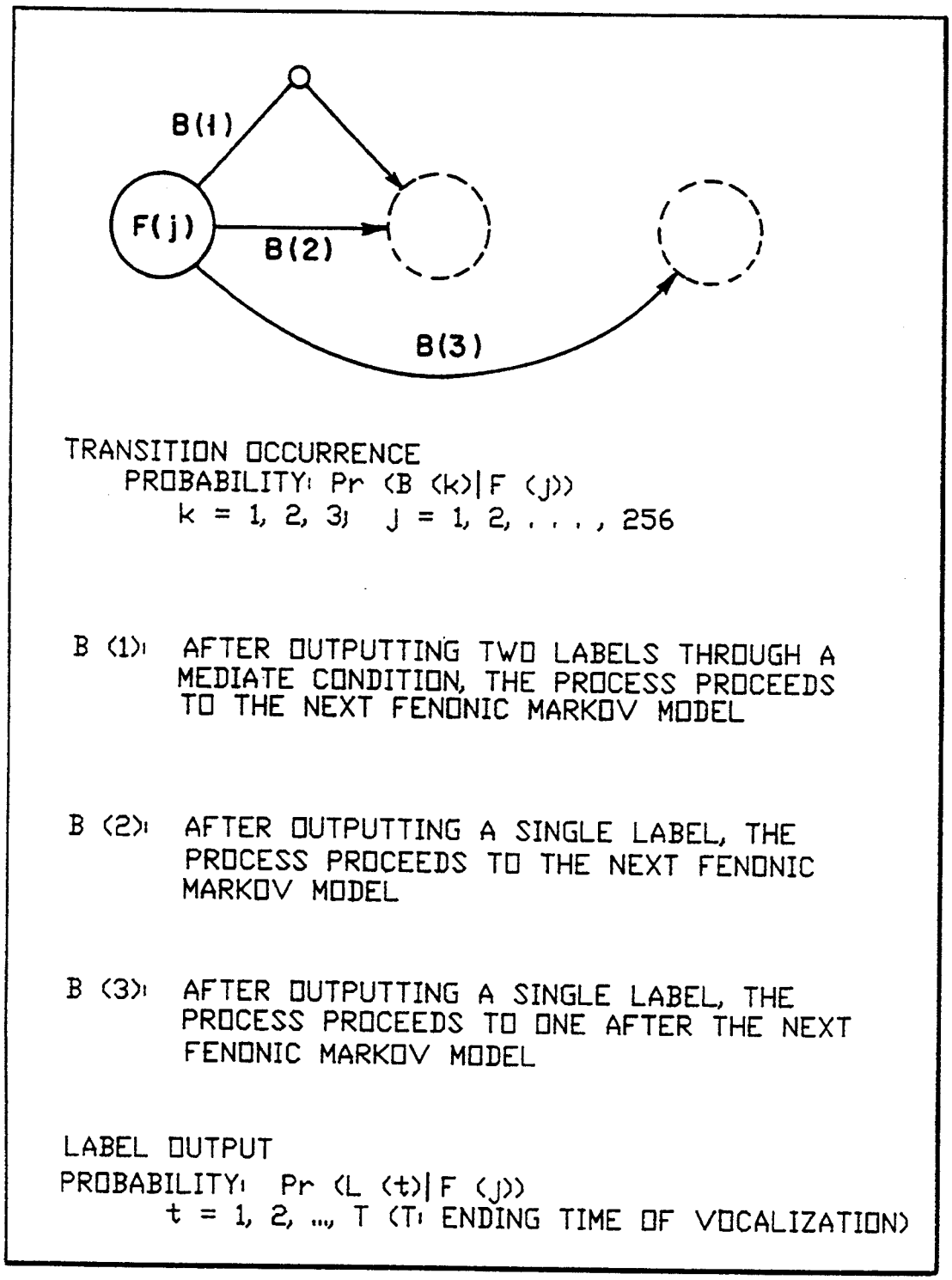
FIG. 1 schematically shows an example of a fenonic Markov model used in an embodiment of the invention.

An embodiment in which the invention is applied to a 1,000-word vocabulary speech recognition system based on fenonic Markov models is explained below with reference to the drawing.

This embodiment uses a polling fast match as a preliminary selecting method, and uses a procedure based on fenonic Markov models for detailed matching, thereby providing a large vocabulary recognition system by using both of these procedures. The polling fast match and detailed matching based on fenonic Markov models will now be explained.

POLLING FAST MATCH

In response to labels obtained for every vocal analysis interval of about 10 msec (this unit is hereinafter called a "frame"), polling fast match scores are obtained from voting functions for each word in a vocabulary. Only those words having the most significant scores at the end of generation (in this embodiment, the most significant 25 words among 1,000 words) are delivered as candidate words for detailed matching. This procedure evaluates only label occurrence probabilities in each frame, and does not include the time sequence of a label stream. However, the polling fast match operates at high speed, and is effective as a preliminary selecting procedure for large vocabulary speech recognition.

The voting function for a word W(i) may be given by, for example, the logarithm of the probability that an utterance of the word W(i) causes a label L(t) to be observed at time t.

Voting Function=log Pr[L(t)|W(t)].

The polling fast match is explained in detail in U.S. Pat. No. 4,718,094.

DETAILED MATCHING

By using hidden Markov Models called fenonic Markov models, detailed matching of the time sequence of a label stream obtained by word vocalization is performed. Fenonic Markov models are explained in detail in U.S. Pat. No. 4,833,712.

FIG. 1 shows the structure of a fenonic Markov model used in the embodiment. Pr(B(k)|F(j)) is the transition probability that the fenonic Markov model F(j) causes transitions B(k). Pr(L(t)|F(j)) is the label output probability that the fenonic Markov model F(j) outputs the label L(t) at time t.

Figure 2:
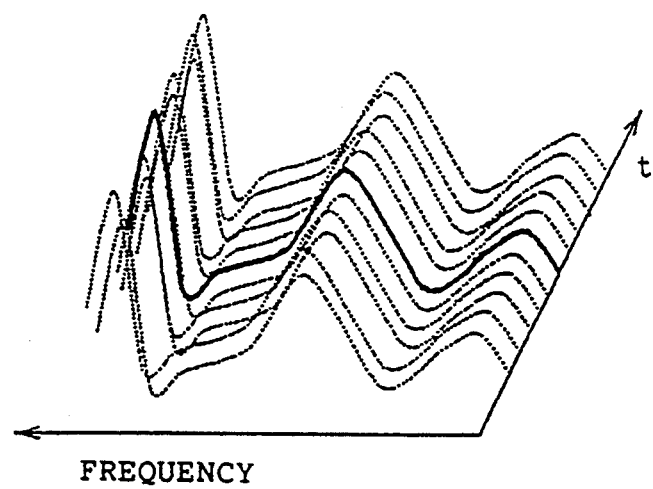
FIG. 2 schematically shows an example of fenonic word speech model used in the same embodiment.
Figure 2:
Figure 2:
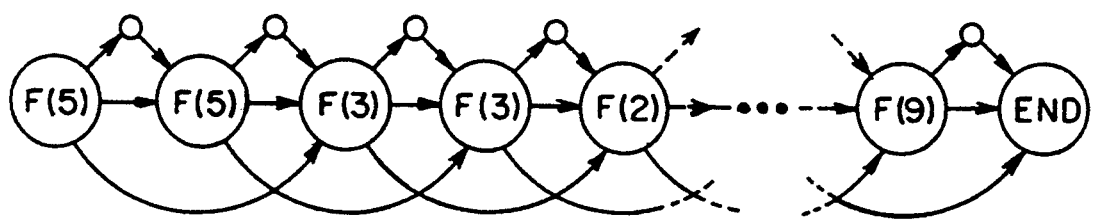

In order to create a Markov model of a word, first a label stream obtained by an utterance of the word is prepared. The label stream is called a base form. As shown in FIG. 2, a sequence of fenonic Markov models corresponding to the label numbers of the label stream is called a fenonic word speech model. A base form is prepared for each recognition target word from actual vocalization thereof, and it is stored in a base form table.

The logarithm of the probability of occurrence of a series of input speech labels L(t) given each candidate word W(i) is estimated by using Viterbi algorithm to produce a detailed match score for each word. The word W(i) having the best score is determined to be the recognition result.

SYSTEM CONSTRUCTION

Construction of the system is explained below with reference to FIG. 3. In this example, the invention uses an IBM Personal System/2 Model 55 (trademark) computer.

Figure 3:
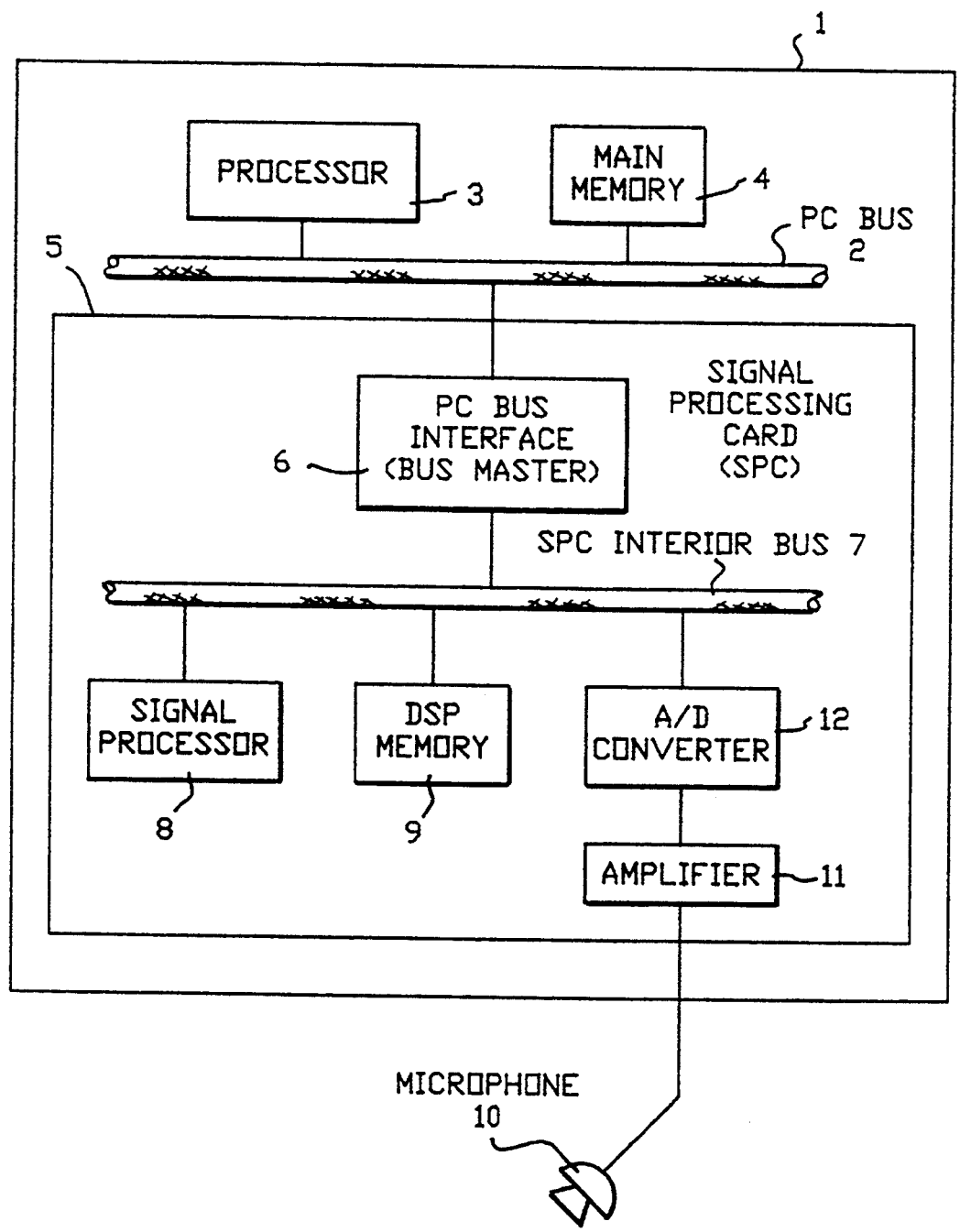
FIG. 3 is a block diagram of an example of a speech recognition system according to the invention.

Referring to FIG. 3, personal computer 1 includes therein a Micro Channel (trademark) PC bus 2 to which a processor 3 of the PC and a main memory 4 of the processor 3 are coupled. The main memory 4 is normally as large as several to ten million bytes (MB) (in this embodiment, 6 MB), and holds all data on a vocabulary recognizable at a point of time (in this embodiment 1,000 words). Specific data content and arrangement in the main memory 4 (memory map) is explained below.

A signal processing card (SPC) 5 is also coupled to the PC bus 2 via a bus interface (bus master) 6. The signal processing card (SPC) 5 includes therein an SPC interior bus 7 to which are connected, in addition to the PC bus interface 6, a high speed digital signal processor (DSP) 8, a high speed DSP memory 9 for the signal processor (DSP) 8, an amplifier 11, and an analog-to-digital (A/D) converter 12. The DSP memory 9 normally has a capacity as much as several tens of kilobytes (KB) (in this embodiment 64 KB), and cannot hold all of data related to the target vocabulary to be recognized. If the DSP memory 9 has a memory as large as the main memory 4 of personal computer 1, it could of course hold all of the data. However, if a large amount of memory having a high speed corresponding to the speed of DSP 8 is on card 5, the DSP memory 9 will become very expensive.

The PC bus interface 6 has the function of a bus master. Because of the bus master function, the interface 6 can temporarily acquire the right of use of the PC bus 2 and, under its own control of the PC bus 2, can perform direct memory access (DMA) transfer.

An input speech is supplied through a microphone 10 and amplifier 11 to the A/D converter 12, and is converted therein into digital data. After this, it is sent through the SPC interior bus 7 and stored in the DSP memory 9. The signal processor (DSP) 8 performs vocal analysis for each frame by using the stored data, and performs extraction of characteristics and labelling.

By using labels obtained in the DSP memory 9 for each frame, the signal processor (DSP) 8 performs a polling fast match of a frame synchronous type. More specifically, every time when an input label is obtained, the score of polling fast match for each word is renewed.

Polling fast match data for all labels (in this embodiment, 256 labels) is stored in the main memory 4. However, for the reason stated above, the polling fast match can be updated solely with data for the single label obtained in the current frame. Therefore, the signal processor (DSP) 8 uses the bus master function of the bus interface 6 to transfer solely the data on the label obtained in the current frame from the main memory 4 to the DSP memory 9 for the polling fast match.

In parallel with labelling and the polling fast match for each frame, the signal processor (DSP) 8 also detects the end of the speech interval. When the end of the speech interval is obtained, processor 8 selects candidate words for detailed matching on the basis of the scores of the polling fast match at that point of time. In this embodiment, the most significant 25 words are maintained as candidates.

Data on all words for detailed matching (in this embodiment, 1,000 words) and label output probabilities for all fenonic Markov models are stored in the main memory 4. (Transition probabilities, which occupy little memory, always stay on the DSP memory 9.) However, since detailed matching is to be performed in a frame synchronous fashion, the required data can be obtained by successively transferring the label output probabilities corresponding to input labels into the DSP memory 9, for the 25 candidate words. For detailed matching, the signal processor (DSP) 8 uses the bus master function of the PC bus interface 6, to transfer Markov model label output probability data for the candidate words from the main memory 4 to the DSP memory 9.

Figure 4:
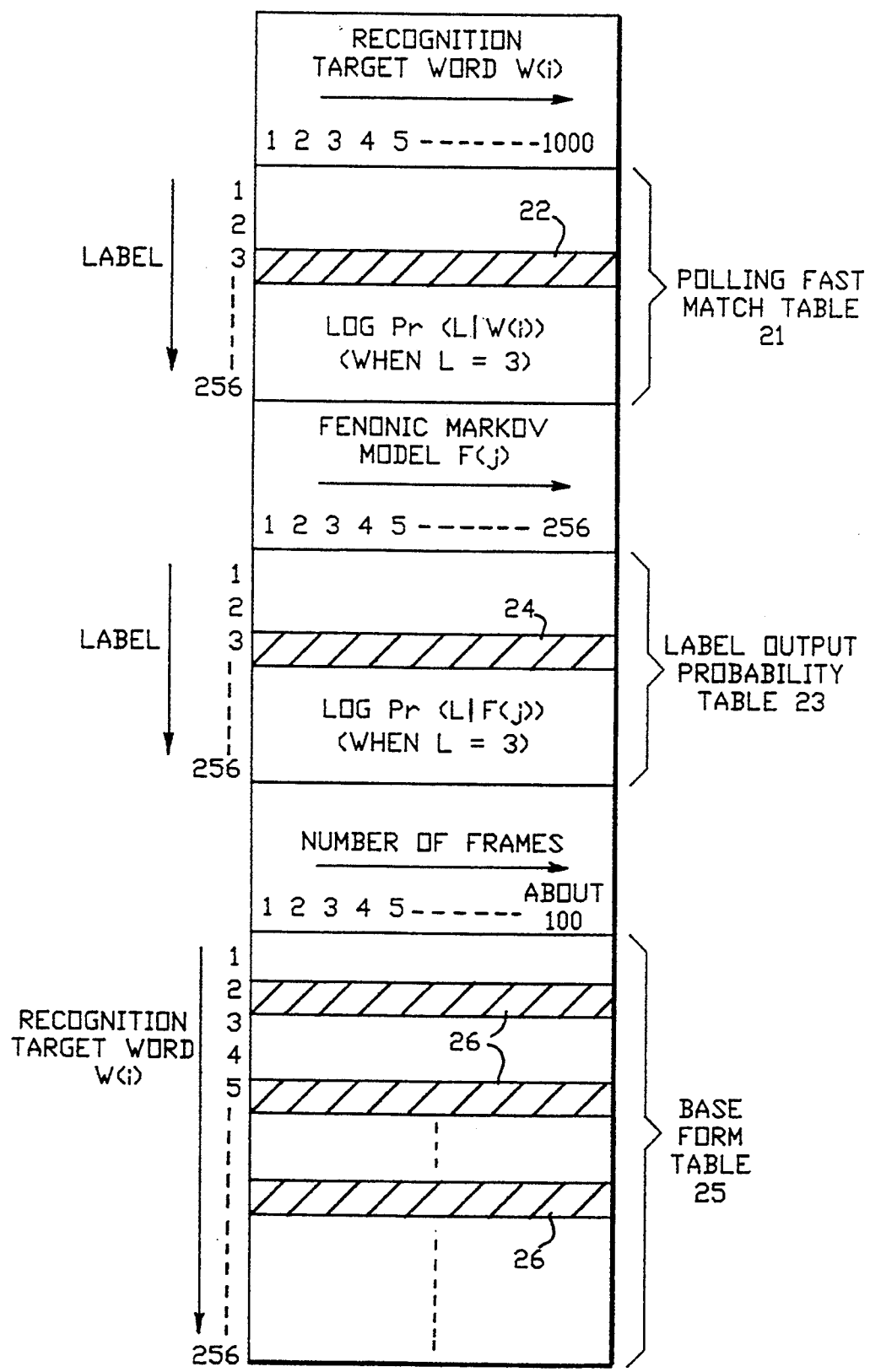
FIG. 4 schematically shows an example of a data structure in main memory and its transfer.

Data structure and transfer are explained below with reference to FIG. 4. Specifically, structures of three tables related to this embodiment, and their transfer are explained respectively.

The voting function used in this embodiment is represented by log Pr(L(t)|W(i)). It is the logarithm of the probability of occurrence of a label L(t) observed at time t when a word W(i) is uttered. The score Sw(i) is given by adding the voting function for t, and the score for each word is updated every time an input label is obtained.

In order to obtain the score, it is necessary to store the probability value table (polling fast match table 21). In this embodiment, there are 1,000 target words, and there are 256 kinds of labels. When each probability consists of 2 bytes, the table size is 512 KB, and it is impossible to store entirely in the DSP memory 9. Therefore, as described above, this table is held in the main memory 4 of PC 1. The signal processing card (SPC) 5 transfers data 22 (in this embodiment, 2 KB) only on the label obtained in the current frame, from the main memory 4 to the DSP memory 9, to perform the polling fast match.

Note that the polling fast match table 21 is such that the probability values for all words of the target vocabulary are arranged for each label in the main memory in order to facilitate DMA transfer and addressing.

Thus, the memory required for the polling fast match on the signal processing card (SPC) 5 is 2 KB for a transfer buffer, and 2 KB for holding the scores Sw (i), for a total of only 4 KB. In case the same label occurs in the next frame (such as a stationary vowel portion), data transfer need not be repeated.

The output probability of a label L(t) of a fenonic Markov model F(j) is represented by logPr(L(t)|F(j)). In order to obtain the likelihood of each word model for the input label stream, a label output probability table 23 is necessary.

In this embodiment, there are 256 kinds of fenonic Markov models, and there are 256 kinds of labels. If each consists of 2 bytes, the table size is 131 KB, and the DSP memory 9 cannot store the entire table. Therefore, in the same manner as the polling fast match table 21, the table 23 is also held in the main memory 4 of PC 1.

Detailed matching is performed in a frame synchronous fashion, and the signal processing card (SPC) 5 reads only data 24 on all fenonic Markov models but for only the current label (in this embodiment, 512 bytes) from the main memory 4 into the DSP memory 9 by using DMA transfer. In the label output probability table 23, output probability values for all of the fenonic Markov models are arranged for each label in the main memory in order to facilitate DMA transfer and addressing. Thus, the memory required for storing output probability values on the signal processing card (SPC) 5 is only 512 bytes. If the same label occurs in the next frame (such as a stationary vowel portion), data transfer need not be repeated.

In this embodiment, the target vocabulary is 1,000 words. Assuming that the average word length is 100 frames, a memory capacity as large as 100 KB is necessary for storing the base forms of all words, and the DSP memory 9 cannot store the base forms of all words. Therefore, in the same manner as the foregoing two examples, the base form table 25 is stored in the main memory 4 of PC 1. The signal processing card (SPC) 5 reads only base form data 26 for candidate words (in this embodiment, 25 words) from the main memory into the DSP memory 9 on the basis of the scores of the polling fast match by using DMA transfer.

Figure 5:
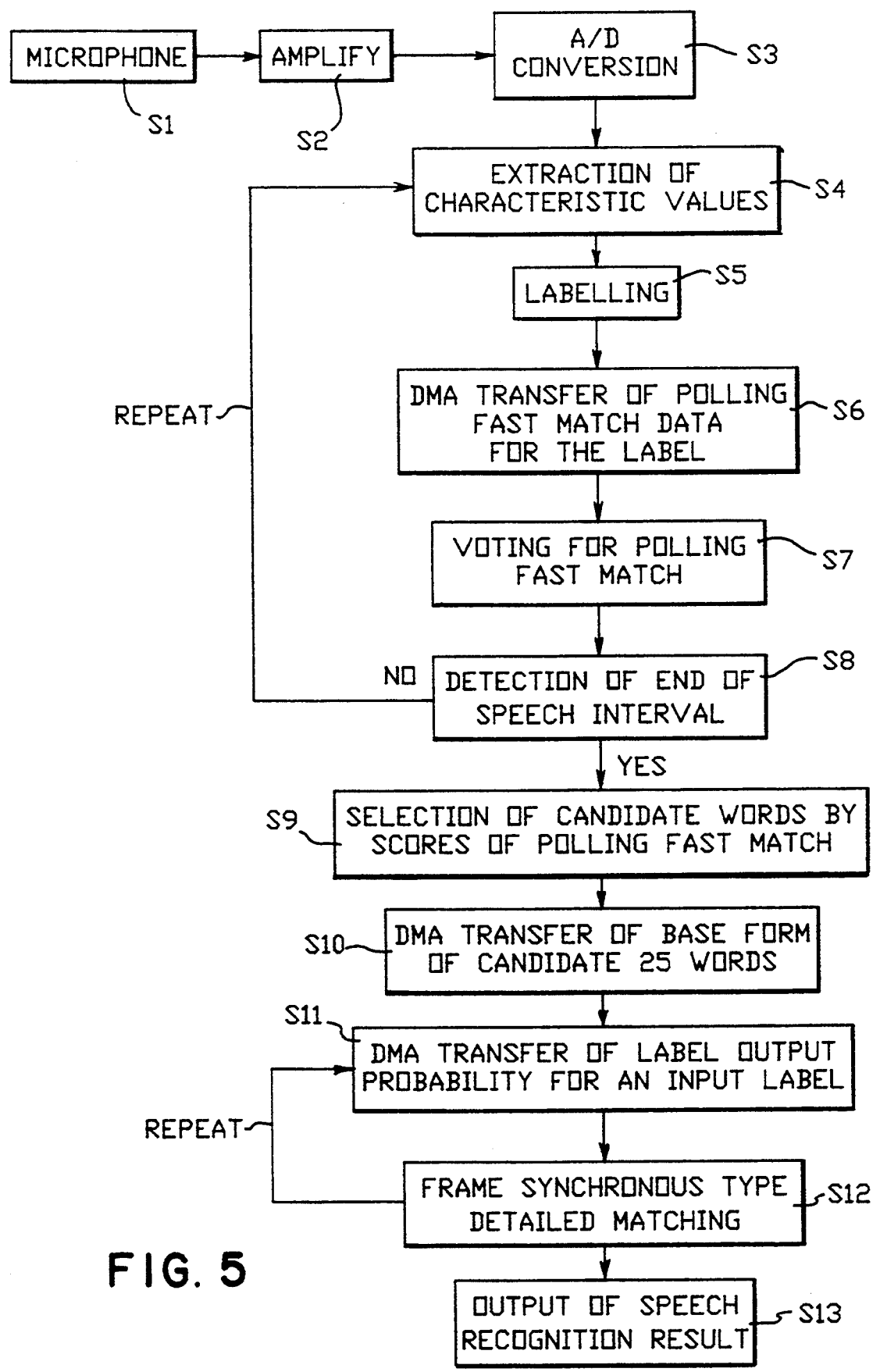
FIG. 5 is a flow chart of an example of a speech recognition method according to the invention

The speech recognition method according to the invention is described with reference to FIG. 5.

An analog input speech signal generated by a microphone in Step S1 is amplified in Step S2, and is converted into a digital signal in Step S3. For each frame, characteristic values are extracted in Step S4, and labels are obtained in Step S5. In Step S6, the data 22 for the polling fast match in regard to the label is DMA-transferred from the main memory to the DSP memory 9. Step S7, by using the data 22, performs voting (scoring) for the polling fast match. Steps S4 to S7 are repeated until the end of the speech interval is detected in Step S8.

When the end of the speech interval is detected in Step S8, Step S9 selects 25 candidate words for detailed matching on the basis of the scores of the polling fast match. Step S10 DMA-transfers the base forms of the 25 candidate words from the main memory 4 to the DSP memory 9. After this, in order to perform detailed matching of the frame synchronous type, output probabilities for the input labels are DMA-transferred from the main memory 4 to the DSP memory 9 in Step S11. The base forms, the foregoing label output probabilities, and the transition probabilities (which are always stored in the DSP memory 9), are used in Step S12 to perform detailed matching of the frame synchronous type. Steps S11 and S12 are repeated for each frame of the speech interval (for each label of the speech interval). Finally, Step S13 outputs words having the highest likelihoods as the recognition result.

As described above, the invention provides low cost, real time large vocabulary speech recognition using a signal processing card packaged on a bus of a PC, without applying a large load on the PC processor.

We claim:

1. A speech recognition system for storing information on probability values of Markov models defining speech models of vocabulary words and information on a set of labels indicating phone types assignable to a micro period of time, for sequentially generating corresponding labels in response to an input speech to generate a label stream of said input speech, for accumulating said probability values of said Markov models on the basis of said speech models of said words and said label stream, and for performing speech recognition on the basis of the accumulated values, comprising:

a bus;
a processor coupled to said bus;
a main memory for said processor for storing said probability values of said Markov models accessibly to each of said labels, said main memory being coupled to said bus; and
a signal processing unit coupled to said bus,
said signal processing unit comprising:
means for storing information on said set of labels;
means for converting an input speech into said label stream on the basis of said information on the set of labels;
means for fetching said probability values of a Markov model related to each of labels contained in said label stream by direct memory access transfer from said main memory;
means for accumulating said probability values thus fetched for each of said vocabulary words; and
means for determining one or more words to be the result of the recognition on the basis of accumulated probability values.

2. A speech recognition system according to claim 1 wherein said means for fetching said probability values by direct memory access transfer is a bus master.

3. A speech recognition system according to claim 2 wherein said signal processing unit includes a memory having a speed higher than that of said memory, said memory temporarily storing said fetched probability values and storing said accumulated probability values.

4. A speech recognition processing unit connectable to a bus of a computer system which computer system includes a processor, a main memory, and an input and output devices coupled in common to said bus, said unit comprising:

means for converting an input speech into a label stream on the basis of information on a set of labels indicating phone types assignable to a micro period of time;
means for fetching probability values of Markov model related to each label contained in said label stream by direct memory access transfer from a main memory which beforehand stores information on said probability values of said Markov models defining speech models of vocabulary words, said information being arranged accessibly to each of said labels;
means responsive to probability values thus fetched for accumulating said probability values for each of said words; and
means responsive to the accumulated probability values for determining one or more words to be the result of the recognition.

5. A speech recognition system for storing information on a set of first labels indicating phone types assignable to a micro period of time, information on probabilities that respective ones of said first labels are produced in utterance of respective vocabulary words, information on speech models of said vocabulary words each represented as a chain of Markov models in a set which set includes Markov models corresponding to respective second labels indicating phone types assignable to a micro period of time, and information on probability values of said Markov models, in response to an input speech, for sequentially producing corresponding first labels to generate a first label stream of said input speech, for determining whether said vocabulary words are recognition candidates by using said first label streams and said probabilities that respective ones of said first labels are produced in utterance of respective vocabulary words, for accumulating said probability values of said Markov models on the basis of speech models of said recognition candidates and said first label stream, and for performing detailed speech recognition on the basis of accumulated probability values, comprising:

a bus;

a processor coupled to said bus;

a main memory for said processor for storing information of said probabilities that respective ones of said first labels are produced in utterance of respective ones of said vocabulary words, and strong information on speech models of each of said vocabulary words, said main memory being coupled to said bus; and a signal processing unit coupled to said bus, further said signal processing unit including:

means for converting said input speech into said first label stream;

means for fetching, for each of labels contained in said first label stream, information on probabilities that respective ones of said vocabulary words produce said first label, said information being fetched by direct memory access transfer from said main memory;

means for accumulating probabilities thus fetched for said vocabulary word respectively upon each of said labels contained in said first label stream;

means for determining candidate words on the basis of the accumulated probabilities;

means, for each of first labels contained in said first label stream, for fetching information on values of probability that respective ones of said labels are produced at particular transitions in models of the candidate words, said information being fetched by direct memory access transfer from said main memory;

means for computing likelihood that said word candidates be said input speech in response to said information on speech models and said information on probability values fetched for respective ones of said first labels; and means for generating a recognition result on the basis of said likelihood.

6. A speech recognition system comprising:

a general purpose computer system comprising a bus, a general purpose processor having a data signal connection to the bus, and a main memory having a data signal connection to the bus, said main memory storing label probability data for each of a plurality of vocabulary words; and an acoustic signal processor having a data signal connection to the bus of the general purpose computer system;

characterized in that the acoustic signal processor comprises:

means for measuring the value of at least one feature of an utterance over a series of successive time intervals to produce a series of label signals representing the feature values;

a bus interface for accessing the main memory of the general purpose computer system through the bus without accessing the general purpose processor, said bus interface retrieving label probability data from the main memory;

a match score processor for generating a match score for each vocabulary word from the label probability data for the vocabulary word obtained through the bus interface and from the series of label signals produced by the measuring means; and an output for outputting one or more vocabulary words having the best match scores.

7. A speech recognition as claimed in claim 6, characterized in that the acoustic signal processor further comprises a buffer memory for temporarily storing label probability data obtained from the main memory through the bus interface.

8. A speech recognition system as claimed in claim 7, characterized in that the buffer memory stores the match scores generated by the match score processor.

9. A speech recognition system as claimed in claim 8, characterized in that the output comprises a display for displaying one or more vocabulary words having the best match scores.

* * * * *